(12) United States Patent  
Luzzatto et al.

(10) Patent No.: US 6,449,359 B1
(45) Date of Patent: Sep. 10, 2002

(54) TELEPHONE IDENTIFICATION CALLING APPARATUS AND PROCEDURES

(75) Inventors: Marco Luzzatto, 33 Betzalel Street, Tel-Aviv 64683 (IL); Andrei Aszodi, Moshav Brosh (IL)

(73) Assignee: Marco Luzzatto (IL)

( * ) Notice: Subject to any disclaimer, the term of this patent is extended or adjusted under 35 U.S.C. 154(b) by 0 days.

(21) Appl. No.: 09/230,488

(22) PCT Filed: Jul. 24, 1997

(86) PCT No.: PCT/IL97/00251
§ 371 (c)(1),
(2), (4) Date: Jan. 26, 1999

(87) PCT Pub. No.: WO98/05151
PCT Pub. Date: Feb. 5, 1998

(30) Foreign Application Priority Data

Jul. 29, 1996 (IL) .................................................. 118971
Jul. 3, 1997 (IL) .................................................. 121225
Jan. 29, 1998 (IL) .................................................. 123110

(51) Int. Cl.⁷ .......................... H04M 1/64; H04M 3/42; H04M 3/00

(52) U.S. Cl. ................................ 379/373.01; 379/67.1; 379/68; 379/88.12; 379/201.01; 379/207.16; 379/252; 379/373.04; 379/374.02

(58) Field of Search ......................... 379/67.1, 68, 69, 379/70, 71, 72, 76, 83, 87, 88.11, 88.12, 88.14, 88.19, 88.2, 88.21, 93.05, 156, 171, 201.01, 201.05, 201.07, 201.11, 207.12, 207.16, 210.01, 210.13, 252, 372, 373.01, 373.02, 373.03, 373.04, 374.01, 374.02, 376.02

(56) References Cited

U.S. PATENT DOCUMENTS

| 4,720,848 A | 1/1988 | Akiyama |
| 4,757,525 A | 7/1988 | Matthews et al. |
| 5,027,384 A | 6/1991 | Morganstein |

(List continued on next page.)

FOREIGN PATENT DOCUMENTS

| DE | 42 22 977 A1 | 1/1994 |
| DE | 94 208298 U1 | 6/1995 |
| EP | 0455912 A2 | 11/1991 |
| FR | 2725574 A1 | 4/1996 |
| GB | 2300994 A | 11/1996 |
| WO | WO 96/15611 A1 | 5/1996 |

OTHER PUBLICATIONS

IBM Technical Disclosure Bulletin, vol. 31, No. 8, Jan. 1989, pp. 261–264.

Primary Examiner—Allan Hoosain
(74) Attorney, Agent, or Firm—Lerner, David, Littenberg, Krumholz & Mentlik, LLP (57) ABSTRACT

Method for improving the calling procedures of telephones by creating customized messages for telephones coupled to a telephone exchange. The messages are registered on one or more sections of memory located in the telephone exchange and coupled to the telephone. The messages can be played over a boosted loudspeaker or the earphone of the telephone. When the telephone is switched on, but is not in communication with another telephone, the ring loudspeaker, if any, and the earphone loudspeaker are deactivated, and the boosted loudspeaker is activated. When a caller telephone receives a call from a caller telephone the activated boosted loudspeaker plays the chosen registered and optionally other messages. When the caller and the called telephone are hooked up, the boosted loudspeaker is deactivated, the earphone loudspeaker is activated and, thereby, placing the caller telephone in communication with said called telephone in the normal way.

20 Claims, 6 Drawing Sheets

U.S. PATENT DOCUMENTS

| | | | |
|---|---|---|---|
| 5,200,994 A | * 4/1993 | Sasano et al. | 379/142 |
| 5,302,284 A | 4/1994 | Seiner et al. | |
| 5,307,399 A | 4/1994 | Dai et al. | |
| 5,317,622 A | 5/1994 | Shinozaki | |
| 5,329,578 A | * 7/1994 | Brennan et al. | 379/67 |
| 5,337,356 A | 8/1994 | Shinozaki | |
| 5,349,638 A | * 9/1994 | Pitroda et al. | 379/142 |
| 5,381,460 A | 1/1995 | Ohashi et al. | |
| 5,400,393 A | 3/1995 | Knuth et al. | |
| 5,481,594 A | 1/1996 | Shen et al. | |
| 5,483,578 A | 1/1996 | Ackermann et al. | |
| 5,559,860 A | * 9/1996 | Miziiovsky | 379/58 |
| 5,754,627 A | * 5/1998 | Butler et al. | 379/63 |
| 5,970,122 A | * 10/1999 | LaPorta et al. | 379/67.1 |
| 5,978,451 A | * 11/1999 | Swan et al. | 379/88.24 |
| 6,018,671 A | * 1/2000 | Bremer | 455/567 |
| 6,160,877 A | * 12/2000 | Tatchell et al. | 379/197 |

* cited by examiner

PS = POWER SUPPLIER
CMC = CALLING MESSAGE CIRCUIT
HP = HIGH POWER
RC = RING CIRCUIT
LP = LOW POWER

TELEPHONE IDENTIFICATION CALLING APPARATUS AND PROCEDURES

FIELD OF THE INVENTION

The invention relates to improvements in telephones, particularly but not exclusively cellular telephones and, more specifically, to a method and apparatus for permitting cellular telephones to be called by means of a customized call message in place of or in addition to the standard call ring, as desired by the cellular telephone owner. Furthermore, this invention relates to a method and apparatus for recognizing calling subscribers by means of a customized list and for being recognized by receiving subscribers by means of a customized outgoing message.

BACKGROUND OF THE INVENTION

Cellular telephones are often used in public places, and several such phones may be present within a limited space, such as a restaurant, a bus or railway station, a waiting room of any kind, and so forth. As a result, it often occurs that ,several cellular telephones ring concurrently, and it is not always immediately clear from which one the ring issues, so that several persons pick up their phone and operate it in the expectation of hearing a message. This creates a degree of confusion and sometimes some embarrassment. In standard, non cellular telephones too the regular call ring may sometimes prove unsatisfactory. Though its intensity may be controlled to a certain degree, it may still prove to be a disagreeable sound and disturb sleeping children or sick persons.

Another problem a telephone user has to face is the uncertainty regarding the identity of the caller. Some methods that allow a filtering of incoming calls are already available. Such methods include the possibility of having the name of the caller appearing on the telephone display provided that the caller belongs to a list prepared and programmed by the receiving subscriber into his telephone. Still, these methods are inconvenient because they require the user to check the display with each new call. In addition, said methods do not provide a solution for the identification of unlisted or unknown callers.

It would be therefore highly desirable, and it is a purpose of this invention, to provide a system for assigning to each telephone, in particular, but not exclusively, a cellular telephone, an acoustic call of its own, in place of or in addition to, the standard ring.

It is another purpose of this invention to provide a system which permits each telephone owner and user—hereinafter, "the subscriber"—to create, his customized call message (hereinafter, briefly, CCM), whether it be a sound, bars of music, a name, a message, and any other call chosen by the subscriber.

It is a further purpose of this invention to provide such a system that does not require extensive and costly modification of the telephone, in particular the cellular telephone, itself, nor significant complications in its relationship with the telephone company and exchange with which the telephone is connected.

It is a still further purpose of this invention to provide such a system that allows the receiving subscriber to prepare a call signal which identifies a specific calling subscriber (Identified Calling Signal—hereinafter, briefly, ICS) and to prepare a list of ICS for a large number of calling subscribers to be actuated in place of or in addition to, the standard ring when said subscribers call the receiving subscriber.

It is a still further purpose of this invention to provide such a system that allows a calling subscriber to prepare a Self-Identifying Outgoing Message (hereinafter, briefly, SIOM) which identifies the calling subscriber to any receiving subscriber, provided that the latter has a telephone equipped with the apparatus described in this application.

It is a still further purpose of this invention to provide such a system that allows a calling subscriber to prepare a Outgoing Information Service Message (hereinafter, briefly, OISM) which transmits useful information to any receiving subscriber, provided that the latter has a telephone equipped with the apparatus described in this application.

It is a still further purpose of this invention to provide such a system which may be implemented without modifying the telephone apparatus itself by adding to the telephone apparatus an add-on device which, combined with the telephone apparatus itself and the telephone exchange resources, allow the creation of a CCM, ICS, SIOM, OISM and other messages and/or other services.

It is a still further purpose of this invention to provide such a system which may be implemented using a combination of the telephone resources with the memory available in the telephone exchange or by adding to the telephone an electronic component which replaces the function of the telephone exchange memory.

It is a further purpose of this invention to provide such a system which is easy to use and actually requires no operations other than those to which a subscriber is already accustomed.

Other purposes and advantages of the invention will appear as the description proceeds.

In order for the invention to be well understood, certain preliminary observations are in order.

Hereinafter, the terms "caller" and "receiver" will respectively indicate the apparatus which sends a call and the apparatus which receives it. Persons using them will be called respectively "the calling subscriber" and "the receiving subscriber". Reference will always be made hereinafter, for purposes of illustration, to cellular telephones, but it should always be understood that this is not a limitation, since the invention is equally applicable to standard, non-cellular telephones. In any case, even when the receiver is a cellular telephone apparatus, the caller may always be any kind of telephone apparatus.

In a normal operation of telephones, when a caller requests the telephone exchange to place it into a connection with a receiver, having a certain number, the exchange sends out a signal at the frequency assigned to the particular receiver—hereinafter called "a dial signal"—which activates a ring in the receiver. Typically, the ring is produced by a loudspeaker—hereinafter "the ring loudspeaker"—driven by an oscillating circuit. This circuit is normally open, and the call from the station—which may merely generate a pulse—causes it to be closed. The same call, generally, causes a display to be lighted on the receiver. Concurrently, the exchange sends to the caller an intermittent ring, corresponding to that which is emitted by the receiver ring loudspeaker. If the receiving subscriber is ready to receive the call, he performs what will be called "a hookup procedure", which will permit a caller to establish contact with the receiver. This is generally done, in cellular telephones, by pressing a button or by lifting a cover which protects the keyboard or in similar ways, or, if the receiver is a standard apparatus, by lifting the earpiece. As soon as the hookup procedure has been performed, the ring is discontinued, the circuit of the ring loudspeaker being once again open, and the exchange places the caller in communication with the receiver for carrying out the desired conversation. During the conversation, a second loudspeaker—hereinafter "the earphone loudspeaker"—much less powerful than the first-mentioned one, so that it has to be placed close to the ear clearly to distinguish the sounds emitted by it, permits the receiving subscriber to hear the message of the calling subscriber. If the receiver is not switched on, the exchange communicates to the caller, after a given number of rings, that the receiver is not available for communication. Cellular telephones are provided with a power source generally in the form of a battery (though the telephone may also be connectable to an outside power source, such as a car battery, or to a power line), and they comprise a controller, essentially a microcircuit, which controls their operations.

It must further be recalled that modern telephone exchanges have a number of what may be called "memory cells", one for each subscriber, wherein messages may be registered from a caller when the receiver is not available for communication, or communication is not requested. Any subscriber can hear the messages destined for him by dialing a certain code, consisting in a number or a key or combination of keys, which automatically places him into communication with the memory cell assigned to him, which is then actuated by the telephone exchange, through suitable computer means, to transmit the recorded message as if it were an incoming call.

SUMMARY OF THE INVENTION

Keeping the above facts in mind, the system according to the invention comprises providing, first of all, in the telephone, particularly the cellular telephone, what will be called hereinafter a "boosted loudspeaker", viz. loudspeaker means that are more powerful than the standard earphone loudspeaker, so that it emits sounds loud enough to be heard in the environment without placing it near the ear. The boosted loudspeaker may be an additional loudspeaker, or the earphone loudspeaker itself, driven, when required, by what will be called a "booster circuit", viz. an additional circuit which delivers more power than the standard one. In non cellular apparatus such boosted loudspeakers are generally provided anyway and are used in telephones to permit to conduct conversations without lifting the earpiece; however, they must be actuated by the subscribers for this purpose. In any case, switch means, practically transistor means, is provided to switch from the boosted loudspeaker and the earphone loudspeaker, and from both said loudspeakers to the ring loudspeaker, if present, and vice versa, as the case may be.

Means are provided in the telephones according to the invention for the dial call, which is emitted by the telephone exchange when calling the telephone as a receiver, to actuate the boosted loudspeaker instead of the ring loudspeaker. By "telephone exchange" is meant herein the exchange with which the cellular telephone in question is connected. The telephone exchange transmits with the dial call what will be called "a customized call message" (hereinafter, briefly, CCM), that is registered, as will be explained hereinafter, in the memory cell assigned to the particular cellular telephone. The customized call message—be it a sound code or a few bars of music or a spoken message—is heard through the boosted loudspeaker in the environment in which the receiver is located.

When the receiving subscriber carries out the hookup procedure, the boosted loudspeaker is disactivated, the earphone loudspeaker is activated, and the receiver is ready to carry out a conversation in a normal way. If the boosted loudspeaker is the earphone loudspeaker itself driven by a booster circuit, the earphone loudspeaker is disconnected from the booster circuit and connected to its ordinary low power circuit. Concurrently, the telephone exchange discontinues the communication of the memory cell with the receiver and places the caller in communication with the receiver in the ordinary way.

Since the boosted loudspeaker draws from the telephone power source more power than the ring loudspeaker, it is desirable, at least in cellular telephones in which the power source is a battery, that it operate for as short a time as possible. Therefore, in an embodiment of the invention means are provided for discontinuing the customized call message and returning to the normal call ring if, after a predetermined short time, the hookup procedure has not been performed. Said means are essentially switch means which switch off the boosted loudspeaker and switch on the ring loudspeaker. In a further embodiment of the invention, said switch means may be actuated by the subscriber, or other switch means may be provided, to keep the boosted loudspeaker switched off and the ring loudspeaker switched on, so that the telephone behaves in a conventional manner, for as long a period of time as the subscriber desires.

In a first embodiment of the invention, when a subscriber wishes to create a customized call message (CCM) or change an existing customized call message, he activates his telephone, dials a predetermined code—a number or a key or a combination of keys -and thus establishes communication with the telephone exchange. When that particular dialing occurs, the telephone exchange places the calling cellular telephone—by means already present for the registration of messages—in communication with the memory cell assigned to it and actuates registration means in the memory cell to register sounds or a words which the calling cellular telephone sends. These are registered in a particular section of said memory cell as a customized call message, to be sent as hereinbefore described when another telephone calls.

In the phones according to the invention, the ring loudspeaker may be missing, but preferably is present and may be disactivated for any length of time by the subscriber by operating a switch or may be automatically and temporarily disactivated by the same means that disactivate the earphone loudspeaker, as hereinafter more fully explained.

In a second embodiment of the invention, a receiving subscriber, in addition to the CCM described in the previous embodiment, creates an Identified Calling Signal (hereinafter, briefly, ICS), for each calling subscriber whom he wishes to identify when he is called by said subscriber. Ultimately, a list of ICS is created. In the same way in which a CCM is created, the creation of a ICS takes place by accessing a dedicated segment of the exchange memory cell by dialing a code which grants access to the ICS service. Then, the telephone number of the calling subscriber that is to be identified, is associated with an audible message created by the receiving subscriber. This is done by inputting the number and the message according to a predetermined routine actuated by the telephone exchange when the receiving subscriber accesses the ICS service.

Unlike for the CCM, which is unique at any given time, a large number of ICS may be stored at any given time. Each ICS may be replaced in overwrite mode.

When a calling subscriber, whose telephone number is listed in the receiving subscriber ICS list, calls the receiving subscriber, the ICS identifying the calling subscriber is sent to the calling subscriber using the same method described in the first embodiment.

In a third embodiment of the invention, a calling subscriber creates a Self-Identifying Outgoing Message (hereinafter, briefly, SIOM) which identifies him to the receiving subscriber, even if he is unknown to him, provided that the receiving subscriber is equipped with an apparatus as described in anyone of the embodiments in this application, and provided that the receiving subscriber has enabled in his telephone the option to receive a SIOM.

As for a CCM or the ICS, the creation or editing of the SIOM takes place by accessing a dedicated segment of the exchange memory cell by dialing a code which grants access to the SIOM service and by recording the SIOM in said segment.

When the calling subscriber calls the receiving subscriber, the telephone exchange of said calling subscriber transmits to the exchange of the receiving subscriber the SIOM of the calling subscriber. Then, the SIOM is sent to the receiving subscriber as if it were a CCM or a ICS. Of course the process is substantially the same in the case that the calling and receiving subscriber happen to be serviced by the same exchange.

In a particular variation of this embodiment, the SIOM may be created by the telephone service provider to which the telephone owner is subscribed. In this case the service provider itself creates the SIOM and places and stores it in the telephone exchange by which the subscriber is served.

The creation of the SIOM by the telephone provider may be carried out in a variety of way. The service provider might, for example, automatically create the SIOM by transforming the name of the subscriber, which is stored in the provider database, into a spoken message. This can be done by using already available software which reads a text and outputs sounds corresponding to the letters, syllables or words which form the text.

In a fourth embodiment of the invention, a calling subscriber creates an Outgoing Information Service Message (hereinafter, briefly, OISM) which contains useful information to be transmitted to any receiving subscriber, provided that the receiving subscriber is equipped with an apparatus as described in anyone of the embodiments in this application, provided that the receiving subscriber has enabled in his telephone the option to receive a OISM and provided that he is subscribed to at least one OISM.

A calling subscriber who creates an OISM might be, for example, a company which transmits to its subscribers news, financial information or any other useful information. Another, out of many possible examples of calling subscriber who create an OISM, might be the service provider itself. The provider might, for example, send every two hours to the receiving subscriber all the messages left for him and stored in the telephone exchange.

An OISM is recorded and sent using the same procedure described for a SIOM but, unlike a SIOM, after the OISM is sent the telephone exchange does not place in communication the receiving subscriber with the calling subscriber even if the hookup procedure takes place. In other words, the OISM does not precede a telephone call and is not followed by a telephone call associated to it, but has an autonomous function.

In a fifth embodiment of the invention an add-on device is plugged to the telephone through its output bus. Said add-on device contains the components which are missing in the specific model of telephone to which it is added and that are necessary in order to create and send a CCM, ICS, SIOM and OISM as described in the previous embodiments. Said components might be the boosted loudspeaker, the microprocessor regulating the actions of the system, means causing the activation and disactivation of the ring loudspeaker, earphone loudspeaker and the boosted loudspeaker, according to the need and the required order, or any other component necessary in order to create and send a CCM, ICS, SIOM and OISM as described in the previous embodiments.

The add-on may be implemented in a variety of ways as long as it contains all the elements and/or components which that enable the add-on device combined to the telephone apparatus to which it is plugged to create and send a CCM, ICS, SIOM and OISM as described in the previous embodiments.

One particular instance of this embodiment is represented by a hands-free set modified to function as the add-on device. The term "hands-free set" in this application means any device which, in conjunction with a cellular phone, a radio phone or a regular phone, enable the user to hold a conversation without having to hold telephone in his hand in the course of the conversation. By "hands-free set" we also refer, specifically but not exclusively, to hands-free car cellular units and hands-free sets for cellular carphones which are designed to enable a hands-free conversation in a car. To this end, a controller is added to the hands-free set. Such controller, among other things, causes the switching between the hands-free set's loudspeaker which, in this particular embodiment functions as boosted loudspeaker, the telephone ear loudspeaker and the ring loudspeaker.

In a sixth embodiment of the invention, the Built-in Identification System (hereinafter, briefly, BIIS), the function performed in the system by the telephone exchange memory cells is replaced by the function performed by an electronic component in which audible messages can be recorded, stored and retrieved at will, added to the telephone apparatus. In this case, CCM, ICS, SIOM and OISM are recorded and stored directly into the memory of the electronic component which basically is a microprocessor. In this embodiment, like in the other ones described in the application, the telephone's controller is programmed to switch between ear loudspeaker, boosted loudspeaker and ring loudspeaker, according to the case.

In all embodiments of the invention, the various operations and functions required or provided by the invention, e.g. the communications between the telephone and the exchange or exchanges and/or the switching between components of the telephone apparatus itself, are controlled by a control which is generally embodied in microprocessor means. Telephone apparatus and, of course, telephone exchanges, are generally provided with a microprocessor component, which need only to be programmed as required by the particular embodiment of the invention. If such a microprocessor were lacking, it could be easily supplied.

It must be noted that calling subscribers, the telephone of whom are equipped and programmed to carry out an embodiment of the invention can communicate with receiving subscribers, the telephone of whom are equipped and programmed to carry out another embodiment of the invention, and vice versa, viz. telephones working according to different embodiments of the invention are compatible.

The expression "customized message", whenever used herein without further specification, includes CCM, ICS, SIOM and OISM.

The method according to the invention comprises therefore the following steps:

1. Method for improving the calling procedure of telephones, which comprises the steps of:

I—creating for each telephone a customized message by:

registering said message or messages in one or more sections of memory means chosen from among that constituted by the memory cell assigned to said telephone in the telephone exchange, that constituted by additional memory means coupled to the telephone, and that constituted partly by said memory cell and partly by additional memory means coupled to the telephone;

II—providing boosted loudspeaker means in said telephone;

III—when said telephone is switched on, but is not in communication with another telephone, causing the ring loudspeaker, if any, and the earphone loudspeaker to be disactivated, and the boosted loudspeaker to be activated;

IV—when a caller telephone dials the number of said telephone, for it to become a receiver, activating the boosted loudspeaker and retrieving from said memory means the chosen aforesaid customized message and optionally other messages registered for said receiver;

V—when the hookup procedure is performed, disactivating the boosted loudspeaker, if not already disactivated, and activating the earphone loudspeaker; and VI—placing the caller telephone in communication with said receiver in the normal way.

Preferably, but not exclusively, the customized call is chosen among: a—messages formulated by the receiving subscriber and identifying the same (Customized Call Message—CCM), b—messages formulated by the receiving subscriber and identifying one or more specific known calling subscribers (Identified Calling Signal—ICS), c—self-identifying messages formulated by the calling subscriber (Self-Identifying Outgoing Message—SIOM), d—messages formulated by the calling subscriber which contain information requested by the receiving subscriber (Outgoing Information Service Message—OISM).

When the memory means is consituted entirely by the memory cell assigned to said telephone in the telephone exchange, the method according to the invention comprises the steps of:

a—calling from said telephone the telephone exchange through a predetermined code;

b—sending to a telephone exchange at least a desired customized message chosen among: a—messages formulated by the receiving subscriber and identifying the same (customized call messages), b—messages formulated by the receiving subscriber and identifying one or more specific known calling subscribers (identified calling signal), c—self-identifying messages formulated by the calling subscriber (self-identifying outgoing message), d—messages formulated by the calling subscriber which contain information requested by the receiving subscriber (Outgoing Information Service Message);

c—registering said message or messages in one or more sections of the memory cell assigned to said telephone;

II—providing boosted loudspeaker means in said telephone.;

III—when said telephone is switched on, but is not in communication with another telephone, causing the ring loudspeaker, if any, and the earphone loudspeaker to be disactivated, and the boosted loudspeaker to be activated;

IV—when a caller telephone dials the number of said telephone, for it to become a receiver, activating the boosted loudspeaker and sending to this latter from said telephone exchange the chosen aforesaid customized message and optionally other messages registered for said receiver;

V—when the hookup procedure is performed, disactivating the boosted loudspeaker, if not already disactivated, and activating the earphone loudspeaker; and VI—placing the caller telephone in communication with said receiver in the normal way.

It will be understood that the messages are sent to a telephone exchange and caused to be recorded therein, as hereinbefore set forth, by the subscriber who has formulated them.

In an additional embodiment, the memory and control means are in the phone.

The activation of the loudspeakers is effected generally by connecting their circuits to a source of power and their disactivation is effected generally by disconnecting their circuits from the source of power.

In a form of the invention, the telephone which creates a customized call message is a cellular telephone.

In a preferred form of the invention:

when a calling subscriber dials the receiving subscriber's number, the telephone exchange sends to this latter a call signal which activates the boosted loudspeaker;

then the customized message is sent from the exchange to the receiving subscriber;

at the end of the customized message, or thereafter at the end of a predetermined period of time, the boosted loudspeaker is disactivated and the ring loudspeaker is activated; and when the hookup procedure has been carried out, the ring loudspeaker is disactivated and the earphone loudspeaker is activated.

The apparatus according to the invention comprises, in each telephone which comprises an earphone loudspeaker:

A—a boosted loudspeaker, consisting of an additional loudspeaker more powerful than the earphone loudspeaker or of an additional circuit driving the earphone loudspeaker with greater power, sufficient to produce sounds that can be heard in the environment;

B—switch means for connecting a source of power alternatively to at least said earphone loudspeaker and said boosted loudspeaker;

C—means for controlling the operation of said switch means;

D—means in the said telephone for signalling to the telephone exchange that said telephone wishes to register a customized message; and in the telephone exchange:

E—means for placing said telephone, when the same signals that it wishes to register a customized message, in communication with a predetermined section of the memory cell assigned to said telephone;

F—means for registering in said memory section the customized message sent by said telephone; and G—means for signalling to a receiver telephone that its customized message is about to be transmitted and for transmitting said customized message.

In a preferred form of the invention, the telephone additionally comprises a ring loudspeaker and the switch means connects the source of power alternatively to said boosted loudspeaker, said ring loudspeaker and said earphone loudspeaker.

Preferably, the said telephone is a cellular telephone. In this case, the power required by the boosted loudspeaker can be provided by available cellular telephone batteries, as long as it is required for limited periods of time.

DETAILED DESCRIPTION OF PREFERRED EMBODIMENT

Embodiment 1—Customized Call Message

Figure 1A:
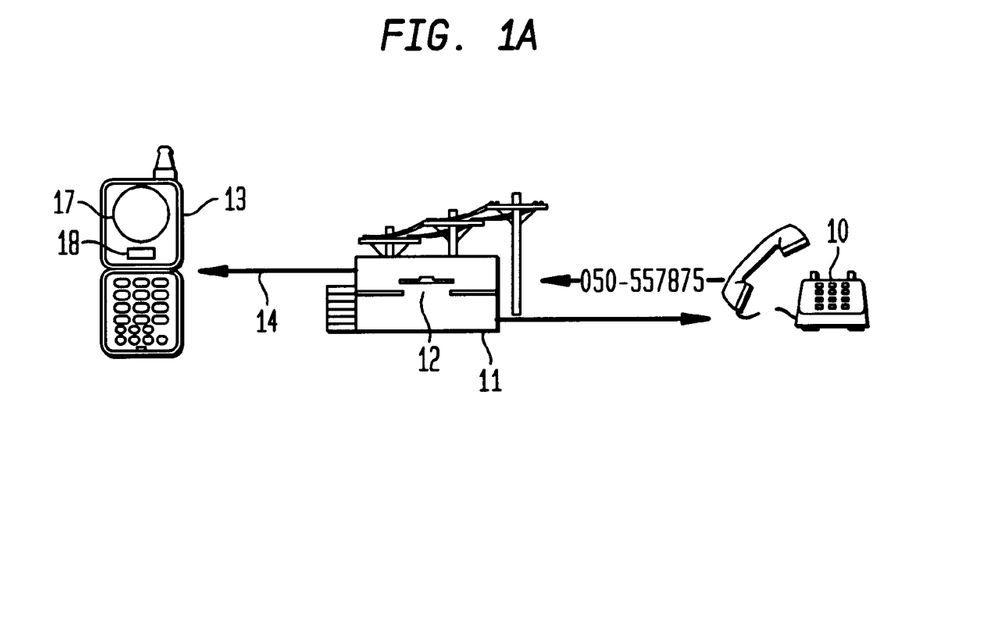
FIGS. 1a and 1b schematically illustrate the connection between a caller and a receiver through a telephone exchange and the reception of a CCM by the receiving subscriber.
Figure 1B:
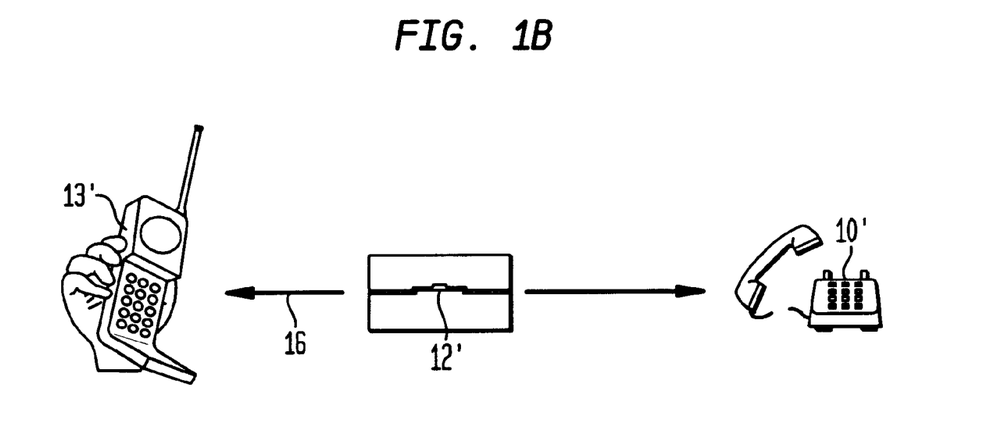

FIGS. 1a and 1b schematically illustrates the connection between a caller and a receiver. In the drawing it is assumed that the receiver is a cellular telephone, but this, as it has been said, is not necessary. The caller, 10 is illustrated as a conventional telephone but could be a cellular telephone as well. As show in FIG. 1a, the calling subscriber 10 dials to the desired receiving subscriber and the dial call reaches the telephone exchange, schematically indicated at 11. Since the caller is illustrated as a conventional telephone, the dial call is assumed to be transmitted to a telephone exchange through a conventional wire line. Still, it must be stressed that the invention and all the embodiments described in this application are applicable to wireless and radio telephone systems as well. At this point, a customized call message (CCM) previously recorded by the receiving subscriber, as hereinafter explained, is sent by the telephone exchange to the receiving subscriber, as indicated at 14. Now the boosted loudspeaker 17 of the the receiver phone is activated and the CCM is heard through said loudspeaker. So far, there is no direct connection between the caller and the receiver, as schematically indicated by a switch 12 in the telephone exchange, which is shown as open.

At this stage, the receiver phone 13 is switched on as shown by a light 18, but a hookup procedure has not been performed yet. When the receiving subscriber hears the CCM, he performs the hookup procedure, as shown in FIG. 1b by lifting the cover or by other means, resulting in the receiver's being ready to receive the incoming call, as is shown at 13'. At this point the boosted loudspeaker is disactivated and the earphone loudspeaker is activated. Then the telephone exchange places the receiving subscriber in communication with the calling subscriber, as symbolically indicated in FIG. 1b by the closure of switch 12 as at 12', and the conversation between caller and receiver can take place 16. This hookup procedure is common to all the embodiments of the invention and therefore will not be described again.

Figure 2:
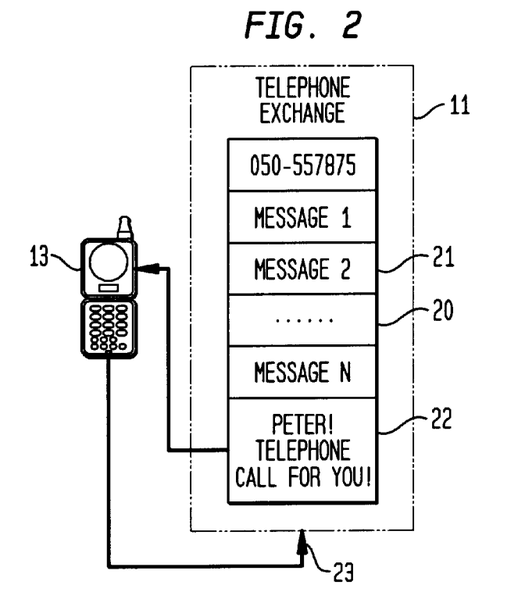
FIG. 2 is a schematic illustration of the creation of a customized call message (CCM), according to an embodiment of the invention.

FIG. 2 schematically illustrates the creation of a customized call message or the substitution of an old customized call message with a new one. The telephone exchange 11, only symbolically indicated, is shown as comprising a memory cell, indicated at 20, for each subscriber, which memory cell is comprised of various sections like the indicated one 21, in each of which a message can be registered. One of them is shown as having the number of the subscriber's telephone registered therein. One cell, indicated as 22, is left free for registering a customized call message and one such possible message is marked on the drawing. The telephone, which is assumed in this schematic illustration to be the cellular telephone receiver 13 of FIG. 1a, dials a code, which, as has been said, can be constituted by a number or by the result of actuating a single key or a combination of keys. The call reaches the exchange, as symbolically indicated at 23, and is transferred to the memory section 22, which could be empty or contain a previously registered, customized call message. Telephone 13 then transmits the customized call message which it wishes to register, and this is registered in memory section 22. If an older customized call message was present, it is canceled and substituted by the new one, in an overwrite operation.

Figure 3A:
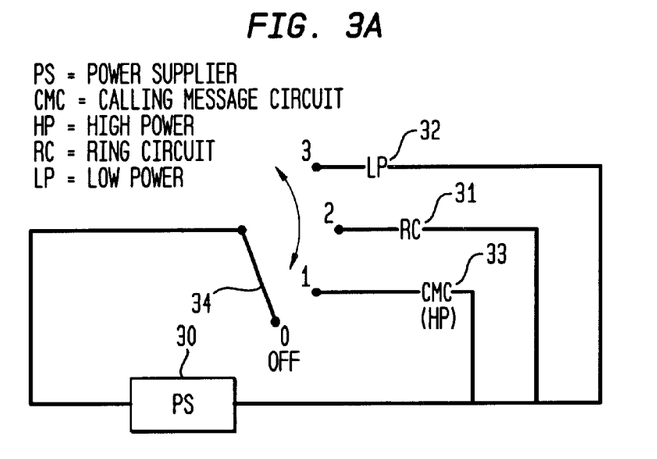
FIGS. 3a and 3b schematically illustrate the response of a receiver to an incoming call, according to an embodiment of the invention.
Figure 3B:
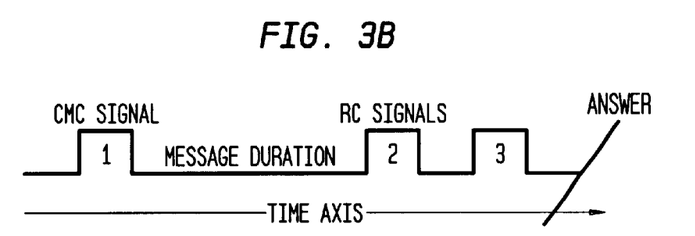

FIGS. 3a and 3b schematically illustrate how the communication between a caller and a receiver is established, when the receiver is provided with a customized call message. A power source (PS) 30, which, in the case of a cellular phone will be a battery and in other case may be a connection to a power line, can be connected to three circuits, that of the ring loudspeaker (RC) 31, that of the earphone loudspeaker (low power circuit LP) 32, and that of the boosted loudspeaker (calling message circuit CMC or high power circuit HP) 33.

In this embodiment, the boosted loudspeaker may consist of the earphone loudspeaker, driven by a circuit which delivers a greater power than the normal circuit, so that the sounds emitted by the loudspeaker can be heard in the environment without placing the receiver next to the subscriber's ear, or may be a separate loudspeaker. A switch 34 permits to connect the power source to any one of the said three circuits. In FIG. 3a, switch 34 is shown in position zero, viz. is open.

FIG. 3b schematically illustrates the calling procedure when the receiver has a customized call message registered in the telephone exchange. Position 1 on the time axis indicates the moment in which the call signal (CS) is sent from the exchange. This signal generally is merely a pulse of a certain frequency. When it is received by the receiver, which is assumed to be switched on. switch 34 shifts to position 1 and connects power source 30 to the boosted loudspeaker circuit 33. Then the customized call message (CCM) is sent from the exchange and is heard in the vicinity of the receiver from the boosted loudspeaker. At the end of the message, position 2 on the time axis is reached. At this point, switch 34 shifts to position 2 and connects power source 30 to the ring loudspeaker circuit 33. Since the duration of the message is predetermined and is short, the power consumed by the boosted loudspeaker is limited and can be supplied by a cellular phone battery for a considerable length of time. From position 2, the ring loudspeaker operates until the hookup procedure is carried out at position 3. Said procedure causes switch 34 to shift to position 3 and connect power source 30 to the earphone loudspeaker circuit 32. Thereafter the conversation between caller and receiver is carried out in the normal way. If the receiving subscriber responds promptly to the customized call message and carries out the hookup procedure before position 2 on the time axis is reached, switch 34 will shift directly from position 1 to position 3 and the ring loudspeaker will not be actuated.

Embodiment 2—Identified Calling Signal

Figure 4:
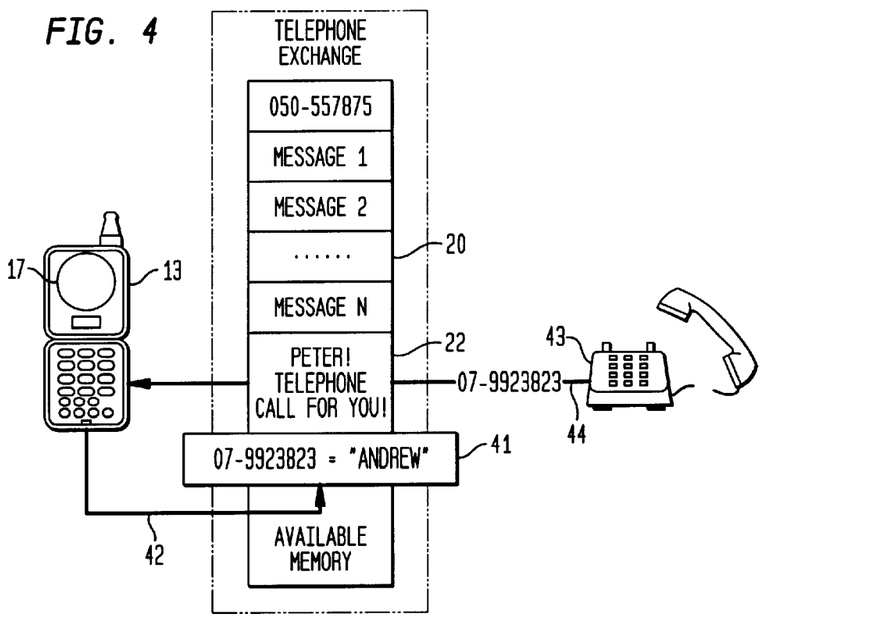
FIG. 4 is a schematic illustration of the creation of an identified calling signal by the receiving subscriber which allows him to recognize the caller (ICS) according to an embodiment of the invention.

FIG. 4 schematically illustrates the receiving subscriber using his telephone 13, which in the illustration is a cellular one but may be of any other kind, to dial a code that gives him access to a dedicated segment of the memory cell of the telephone exchange 41. This segment stores a number of records which comprise at least two elements: (a). the telephone number of the calling subscriber to be recognized (b). an audible message, preferably but not necessarily a spoken one.

The receiving subscriber inputs 42 into the segment the record elements (a) and (b) or additional ones as needed, following a procedure predetermined by a computer program resident into the telephone exchange. Once the procedure is completed a correspondence is created between (a) and (b). A given record may be partially edited or entirely replaced by another one in overwrite mode, depending on the computer program resident into the telephone exchange. When a calling subscriber 43 wishes to communicate with the receiving subscriber 13 the calling subscriber's dial signal 44 is sent to the telephone exchange as it happens for every call. If the telephone of the receiving subscriber is equipped with the apparatus, means and method necessary for creating a CCM as described in embodiment 1 of this application, the boosted loudspeaker 17 is switched on, provided that the receiving subscriber has enabled this option. Than, the receiving subscriber's CCM stored in 22 is transmitted by the telephone exchange to the receiver and it is heard through the boosted loudspeaker 17. Depending on the option chosen by the receiving subscriber, the CCM may be replaced after a laps of time predetermined by him, with the normal ring. In this case, the boosted loudspeaker is disactivated and the ring loudspeaker is switched on.

If the telephone number corresponding to the calling subscriber's dial signal is registered in one of the records of the receiving subscriber's memory cell, as, e.g. in 41, the audible message associated with said number is transmitted to the receiving subscriber and heard through the boosted loudspeaker. If the ring loudspeaker is on, it will be disactivated while the boosted loudspeaker will be switched on.

Then, the Identified Calling Signal (ICS) is heard through the boosted loudspeake. After a length of time determined by the receiving subscriber, the boosted loudspeaker may be switched to the normal ring loudspeaker in order to save power if the receiver in question is a cellular phone drawing his power from a battery.

Then the telephone exchange places the calling subscriber and receiving subscriber in communication, as described in embodiment 1, after the receiving subscriber has performed the hookup procedure by lifting the receiver or by lifting the telephone cover, depending on the type of telephone being used.

Embodiment 3—Self-Identifying Outgoing Message

Figure 5:
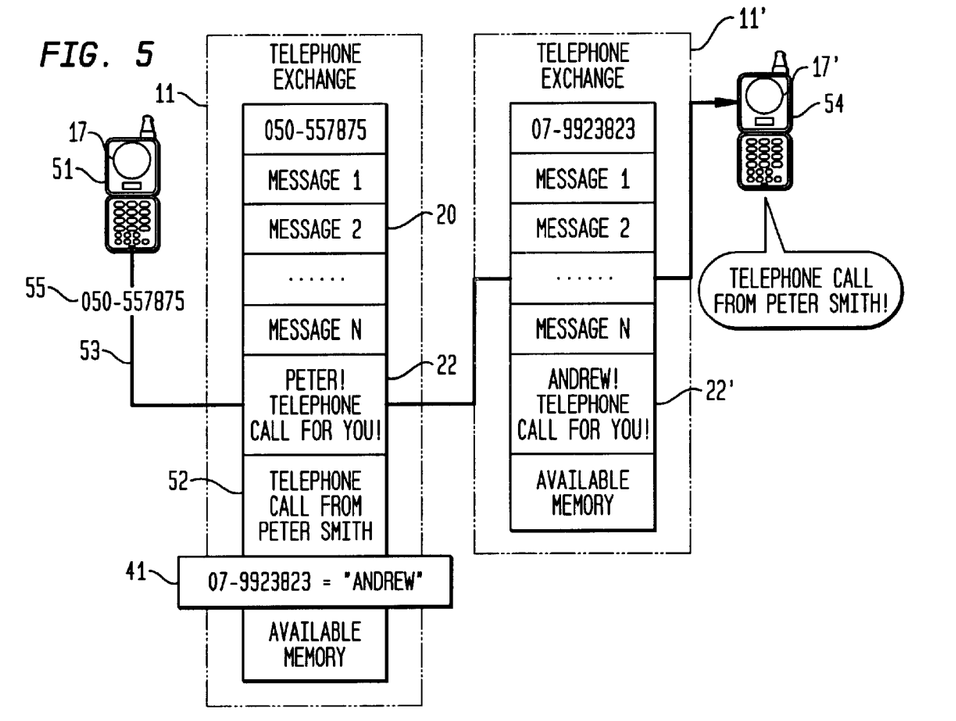
FIG. 5 is a schematic illustration of the creation of a self-identifying outgoing message (SIOM) by the calling subscriber which identifies him to other callers according to an embodiment of the invention.

FIG. 5 schematically shows the calling subscriber using his telephone 51, which in the illustration is a cellular one but may be of any other kind, to dial a code that gives him access to a dedicated segment 52 of the memory cell 20 of the telephone exchange 11 by which he is serviced. The memory cell 20 in FIG. 5 is shown as already storing CCM 22 and ICS 41 described in embodiment 1 and embodiment 2.

FIG. 5 shows the calling subscriber as already having input 53 into segment 52 and additional record using a recording procedure similar to that described embodiment 1 and embodiment 2. This record, defined as Self-Identifying Outgoing Message (SIOM), serves the purpose of identifying the calling subscriber to a receiving subscriber, provided that the latter is equipped with the same apparatus means and methods described in one of embodiments 1,2 and 3. The SIOM consists of at least one audible element, typically but not exclusively a spoken message by the calling subscriber stating his name.

When a calling subscriber 51 wishes to communicate with the receiving subscriber 54, the calling subscriber's dial signal 55 is sent to the telephone exchange as it happens for every call. If a SIOM associated with said dial signal is stored in the memory cell, the telephone exchange servicing the calling subscriber retrieves the SIOM from the memory segment 52 in which it is stored and transmits it to the telephone exchange 11' of the receiving subscriber 54. In FIG. 5 the two telephone exchanges are shown as being two separate ones (11 and 11') but it is irrelevant in this invention whether indeed it is so or whether the calling subscriber and the receiving subscriber are serviced by the same telephone exchange.

If the telephone of the receiving subscriber 54 is equipped with the apparatus, means and method described in one of embodiments 1,2 and 3, the CCM of the receiving subscriber is transmitted by his telephone exchange 11' to the receiver and it is heard through the boosted loudspeaker (17') provided that the receiving subscriber has enabled this option. Then, if the calling subscriber has been previously identified by the receiving subscriber by means of ICS, the Identified Calling Signal will be sent to the receiving subscriber by his telephone exchange 11' and heard through the boosted loudspeaker 17'.

Then, the calling subscriber telephone exchange 11 will transmit to the receiving subscriber telephone exchange 11' the SIOM which will be heard trough the boosted loudspeaker 17'.

If the receiver is a cellular phone drawing his power from a battery, after a lapse of time predetermined by the receiving subscriber the boosted loudspeaker may be switched off and the ring loudspeaker may be activated in order to save power.

Then the telephone exchange places the calling subscriber and receiving subscriber in communication, as described in embodiment 1, after the latter has performed the hookup procedure by lifting the receiver or by lifting the telephone cover, depending on the type of telephone being used.

As mentioned before in this application, a variation of this embodiment is represented by the Outgoing Information Service Message (OISM). From a functional point of view, the description of the SIOM applies also to the OISM while the two embodiments differ only in the content and purpose of the message being recorded and transmitted.

Embodiment 4—Outgoing Information Service message

The OISM is recorded and sent in the same manner of the SIOM, and therefore is not separately illustrated. The OISM represents a limited version of the SIOM, in that it is not preceded or followed by a telephone call associated to it, but has an autonomous function.

Embodiment 5—Add-On Device

Figure 7A:
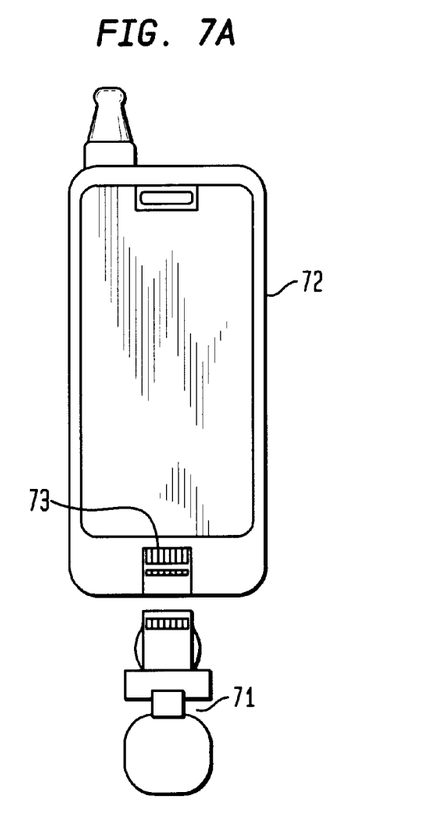
FIG. 7 is a schematic illustration of an add-on device plugged to a cellular telephone according to an embodiment of the invention.

FIG. 7a schematically shows an add-on device 71 that is plugged to the telephone 72 through the telephone's output bus 73. Said add-on device contains the components that are missing in the specific model of telephone to which it is to be added, and which are necessary in order to create and send a CCM, ICS, SIOM and OISM as described in the previous embodiments. Said components may be the boosted loudspeaker, the microprocessor regulating the actions of the system, means causing the activation and disactivation of the ring loudspeaker, the earphone loudspeaker or the boosted loudspeaker, or any other component necessary in order to create and send a CCM, ICS, SIOM and OISM as described in the previous embodiments.

Figure 7B:
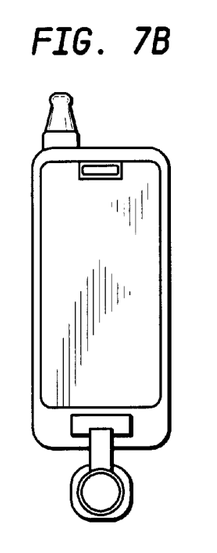

FIG. 7b shows a back view of the add-on device after it has been plugged to the telephone apparatus which, in this specific example, is a cellular phone, but can be of any other kind as long as it has an output bus or another outlet to which the add-on device can be plugged.

Figure 7C:
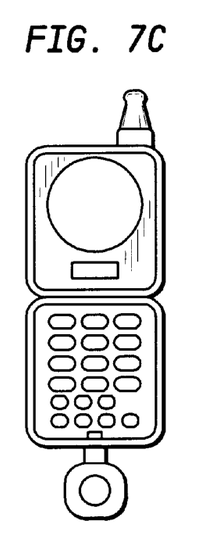

FIG. 7c shows a front view of the same plugged add-on device, after it has been plugged to the telephone apparatus.

The add-on may be implemented in a variety of ways as long as it contains all the elements and/or components which that enable the add-on device, combined to the telephone apparatus to which it is plugged, to create and send a CCM, ICS, SIOM and OISM as described in the previous embodiment.

Figure 8:
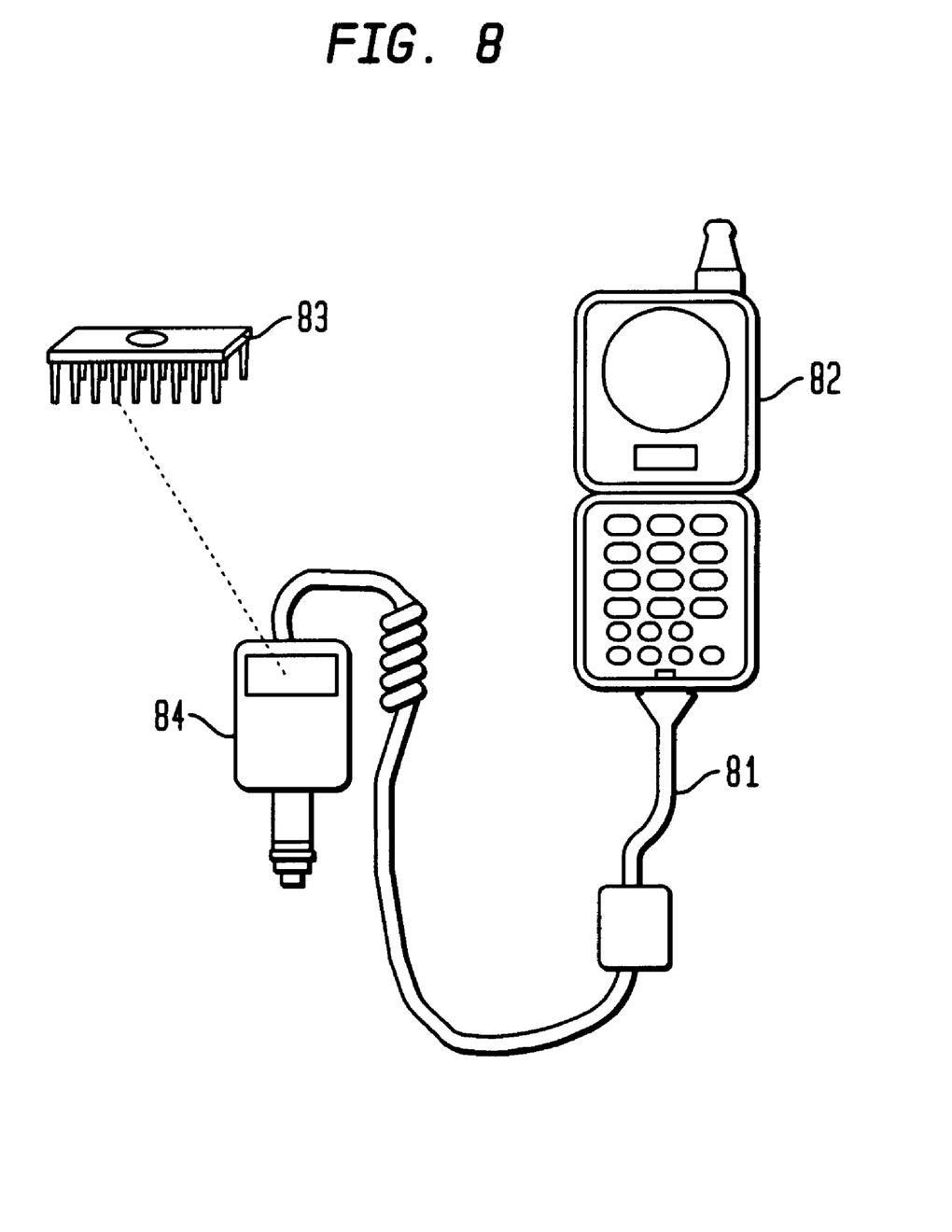
FIG. 8 is a schematic illustration of an add-on device implemented in a handsfree telephone set according to an embodiment of the invention.

FIG. 8 shows a variation of this embodiment represented by a hands-free set modified to function as the add-on device. The term "hands-free set" in this application means any device which, in conjunction with a cellular phone, a radio phone or a regular phone, enables the user to hold a conversation without having to hold telephone in his hand in the course of the conversation. By "hands-free set" we also refer, specifically but not exclusively, to hands-free car cellular units and hands-free sets for cellular earphones which are designed to enable a hands-free conversation in a car.

In FIG. 8, a hands-free set 81 is shown plugged to a cellular phone 82. The addition of the controller 83 to the hands-free set, turns the latter into an add-on device which fits the description of this embodiment. Such a controller, among other things, is programmed to cause the switching between the hands-free set's ring loudspeaker and the hands-free set's loudspeaker 84 which, in this particular embodiment, functions as boosted loudspeaker.

Embodiment 6—Built-in Identification System

Figure 6:
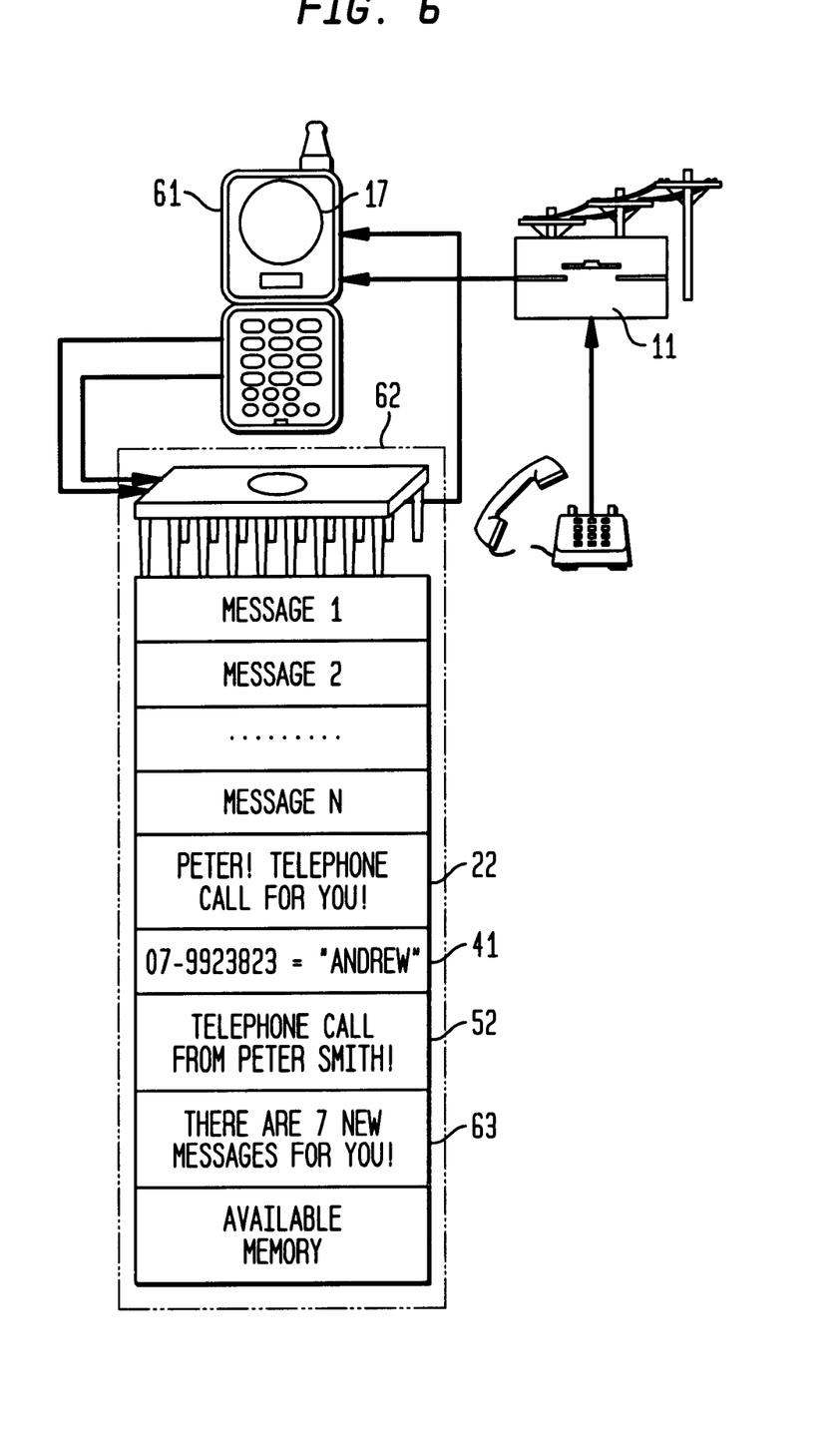
FIG. 6 is a schematic illustration of the built-identification system (BIIS) where the memory storing the different messages is in an electronic component of the telephone instead that in telephone exchange, according to an embodiment of the invention.

FIG. 6 schematically illustrates a variation of embodiments 1—5 which may be carried out by adding to the receiver 61 an electronic component 62 capable of storing audible messages and by programming the receiver's controller in such a way that:

(a) The registration and reception of audible call messages and more specifically, but not exclusively, CCM 22, ICS 41, SIOM 52 and OISM 63, is enabled.

(b) When an incoming call signal is received by the receiving subscriber from the telephone exchange 11, electronic component 62 is activated and CCM and/or ICS, can be retrieved from the component and heard through the boosted loudspeaker after it has been switched on; further, if the caller has registered and stored in
the telephone exchange 11 a SIOM and/or an OISM, said message are sent to the receiving subscriber by the exchange and can be heard after the boosted loudspeaker has been switched on.

(c) When an telephone owner is calling another subscriber, SIOM and OISM can be retrieved from electronic component 62 and transmitted to another subscriber.

In embodiment 6, electronic component 62 replaces the telephone exchange memory cell described in embodiments 1–5, but otherwise all methods remain as described in the previous embodiments.

While specific embodiments of the invention have been described for the purpose of illustration, it will be understood that the invention may be carried into practice by skilled persons with many modifications, variations and adaptations, without departing from its spirit or exceeding the scope of the claims.

What is claimed is:

1. A method for improving the calling procedure of a cellular telephone connected to a telephone exchange having a memory cell assigned to said cellular telephone, said cellular telephone having an earphone loudspeaker, a ring loudspeaker and means for performing a standard hook-up procedure, whereby said cellular telephone is placed in communication with calling telephones through said telephone exchange, said method comprising:

creating at least one customized message for said cellular telephone by registering said customized message in memory means;

providing a boosted loudspeaker in said cellular telephone;

activating said boosted loudspeaker and deactivating said earphone loudspeaker and said ring loudspeaker when said cellular telephone is switched on but is not in communication with another telephone;

activating said boosted loudspeaker and retrieving said at least one customized message when said cellular telephone receives an incoming call, and sounding said retrieved at least one customized message through said boosted loudspeaker;

performing said standard hook-up procedure while deactivating said boosted loudspeaker if said boosted loudspeaker is not already deactivated, and activating said earphone loudspeaker; and placing said incoming call in communication with said cellular telephone through said telephone exchange.

2. The method according to claim 1, whereby said at least one customized message is registered in a portion of said memory means comprising said memory cell.

3. The method according to claim 1, whereby said at least one customized message is registered in a portion of said memory means comprising an additional memory means coupled to said cellular telephone.

4. The method according to claim 1, whereby said at least one customized message is registered in a portion of said memory means comprising a combination of said memory cell and additional memory means coupled to said cellular telephone.

5. The method according to claim 1, wherein said at least one customized message is selected from the group consisting of:

a customized call message formulated by a user of said cellular telephone that identifies said user;

an identified calling signal message formulated by said user that identifies one or more known possible callers;

a self-identifying outgoing message formulated by possible callers; and an outgoing information service message formulated by said possible callers that contain information for said user.

6. The method according to claim 5, wherein said memory means further comprises said memory cell assigned to said cellular telephone in said telephone exchange and additional memory means coupled to said cellular telephone, and wherein said cellular telephone further comprises an electronic component capable of storing audible messages, said method further comprising the following steps:

activating said boosted loudspeaker and said electronic component when an incoming call signal is received by said cellular telephone;

retrieving said at least one customized message from said additional memory means if said at least one customized message comprises said customized call message and/or said identified calling signal message, placing said at least one customized message in said electronic component, and sounding said at least one customized message through said boosted loudspeaker;

sending said self-identifying outgoing message or said outgoing information service message to said cellular telephone from said telephone exchange and sounding said self-identifying outgoing message or said outgoing information service message through said boosted loudspeaker; and retrieving said self-identifying outgoing message or said outgoing information service message from said electronic component and transmitting to another telephone if said user of said cellular telephone is calling said another telephone.

7. The method according to claim 5, wherein said at least one customized message comprises said customized call message and is formulated and recorded by said user of said cellular telephone.

8. The method according to claim 5, wherein said at least one customized message comprises said identified calling signal message and is formulated and recorded by said user of said cellular telephone.

9. The method according to claim 5, wherein said at least one customized message comprises said self-identifying outgoing message or said outgoing information service message and is formulated and recorded by a party calling said user of said cellular telephone.

10. The method according to claim 1, wherein said memory means comprises said memory cell assigned to said cellular telephone, and said creating of said at least one customized message further comprises the steps of:

calling said telephone exchange from said cellular telephone by means of a predetermined code;

sending said at least one customized message to said telephone exchange; and registering said at least one customized message in one or more sections of said memory cell assigned to Said cellular telephone.

11. The method according to claim 10, further comprising the steps of:

sending a call signal from said telephone exchange to said cellular telephone when a caller dials said cellular telephone, thereby activating said boosted loudspeaker;

sending a customized call message from said telephone exchange to said cellular telephone;

deactivating said boosted loudspeaker and activating said ring loudspeaker at the end of said customized call message or after a predetermined period of time; and deactivating said ring loudspeaker and activating said earphone loudspeaker after said standard hook-up procedure is finished.

12. The method according to claim 1, wherein said earphone loudspeaker, said ring loudspeaker and said boosted loudspeaker are activated by connecting said earphone loudspeaker, said ring loudspeaker and said boosted loudspeaker to a source of power, and are deactivated by disconnecting said earphone loudspeaker, said ring loudspeaker and said boosted loudspeaker from said source of power.

13. Apparatus for improving a calling procedure of a cellular telephone having an earphone loudspeaker, connected to a telephone exchange with a memory cell assigned to said cellular telephone, said apparatus comprising:

a boosted loudspeaker sufficiently powered to produce sounds in an environment adjacent to said cellular telephone;

switch means for connecting a source of power alternatively to at least said earphone loudspeaker and said boosted loudspeaker;

means for controlling said switch means;

means for signaling said telephone exchange that said cellular telephone is preparing to register a customized message;

said telephone exchange including means for placing said cellular telephone in communication with said memory cell when said cellular telephone activates said means for signaling, means for registering said customized message in said memory cell, and means for transmitting said customized message.

14. The apparatus according to claim 13, wherein said boosted loudspeaker comprises an additional loudspeaker more powerful than said earphone loudspeaker.

15. The apparatus according to claim 13, wherein said switch means connects said source of power successively to said boosted loudspeaker, a ring loudspeaker, and said earphone loudspeaker.

16. The apparatus according to claim 13, wherein said boosted loudspeaker comprises an additional circuit driving said earphone loudspeaker with greater power.

17. The apparatus according to claim 13, wherein said apparatus comprises an external add-on device that is coupled to said cellular telephone through an output bus.

18. A cellular telephone with improved calling procedures, provided with a ring loudspeaker and an earphone loudspeaker and located in an environment, comprising:

a boosted loudspeaker, sufficiently powered so as to produce sounds that can be heard in said environment of said cellular telephone;

switch means for connecting a source of power successively to said boosted loudspeaker, said ring loudspeaker and said earphone loudspeaker;

means for controlling operation of said switch means;

memory means;

means for registering at least one customized message in said memory means;

means for accessing said memory means when a call signal is sent or received, in order to retrieve said at least one customized message; and means for sounding said at least one customized message through said boosted loudspeaker.

19. The cellular telephone according to claim 18, wherein said boosted loudspeaker comprises an additional loudspeaker more powerful than said earphone loudspeaker.

20. The cellular telephone according to claim 18, wherein said boosted loudspeaker comprises an additional circuit driving said earphone loudspeaker with greater power.

* * * * *